Jan. 22, 1946. R. G. McCOY 2,393,548
WINDING MACHINE
Filed Sept. 1, 1944 9 Sheets-Sheet 1

INVENTOR
R. G. McCOY
BY
J. Mac Donald
ATTORNEY

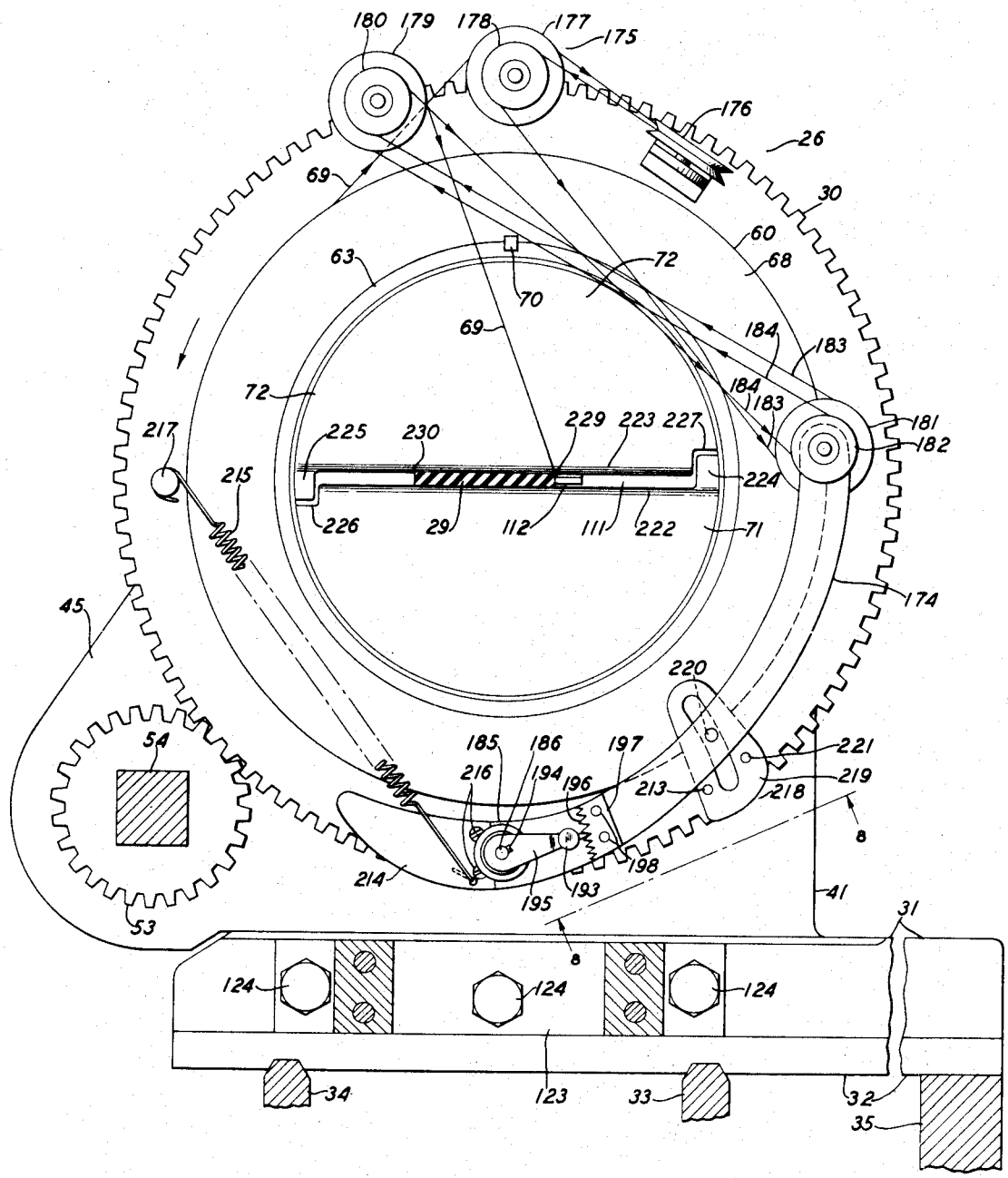

Jan. 22, 1946.     R. G. McCOY     2,393,548
WINDING MACHINE
Filed Sept. 1, 1944     9 Sheets-Sheet 3

INVENTOR
R. G. McCOY
BY J. MacDonald
ATTORNEY

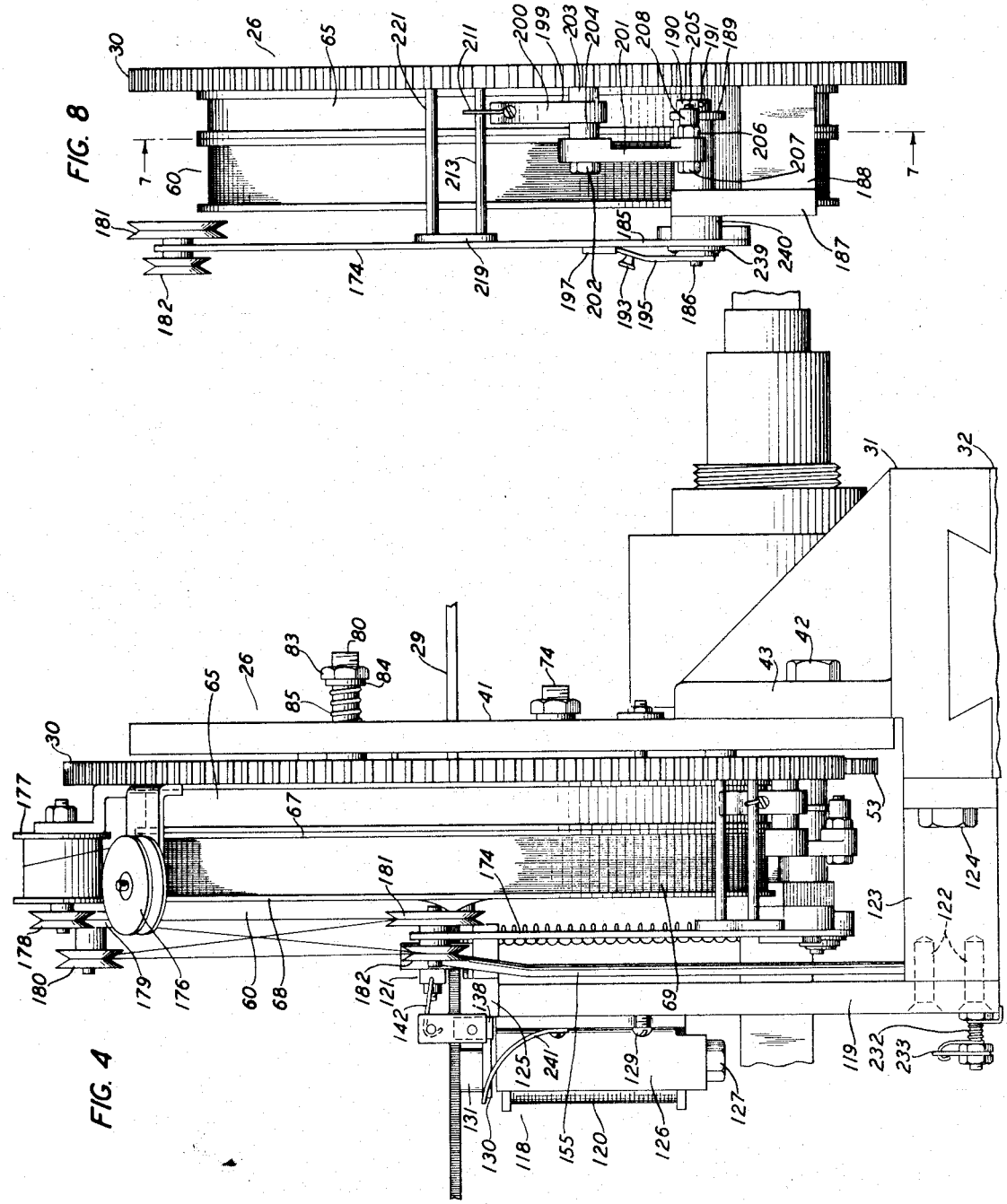

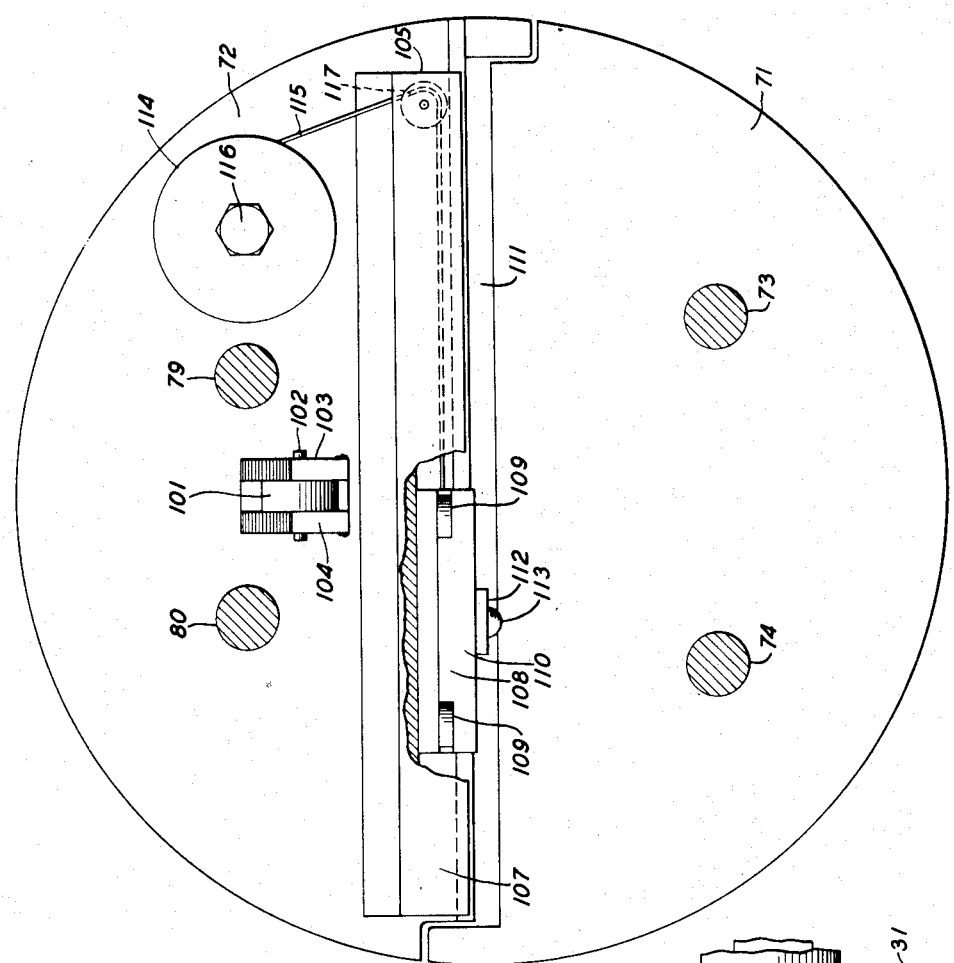

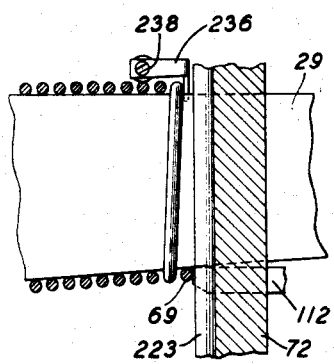
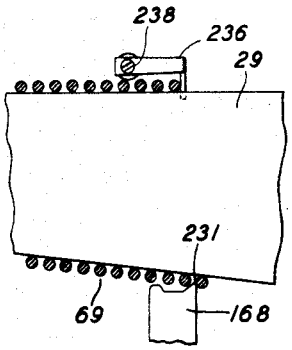
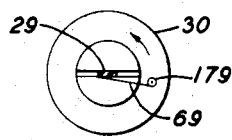
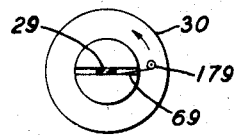
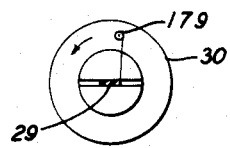
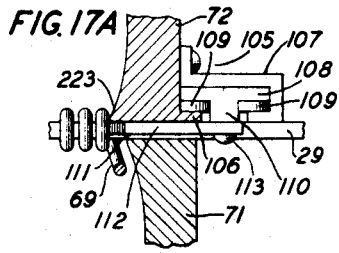
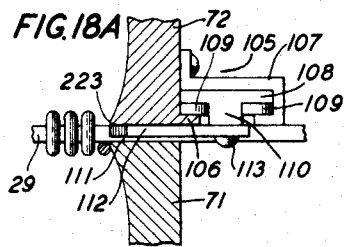
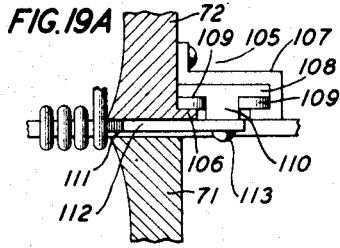
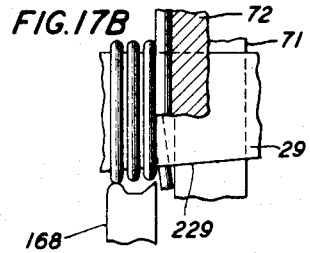
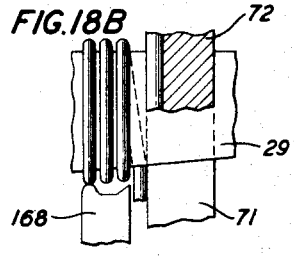
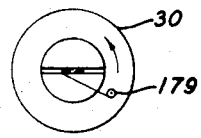
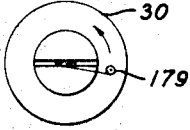
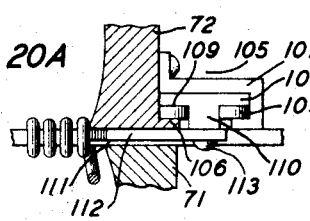
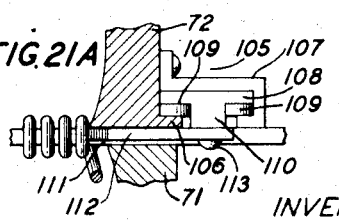

Jan. 22, 1946. R. G. McCOY 2,393,548
WINDING MACHINE
Filed Sept. 1, 1944 9 Sheets-Sheet 7
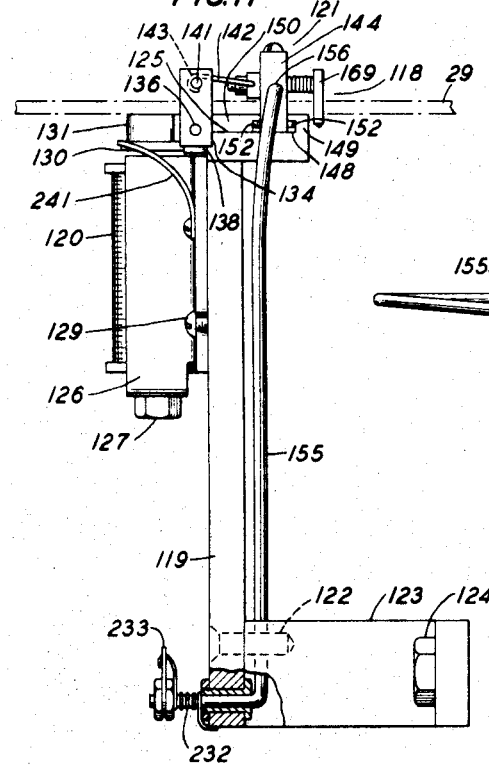
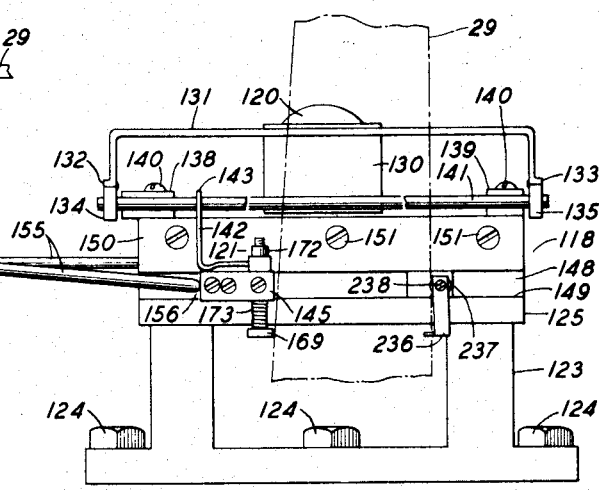
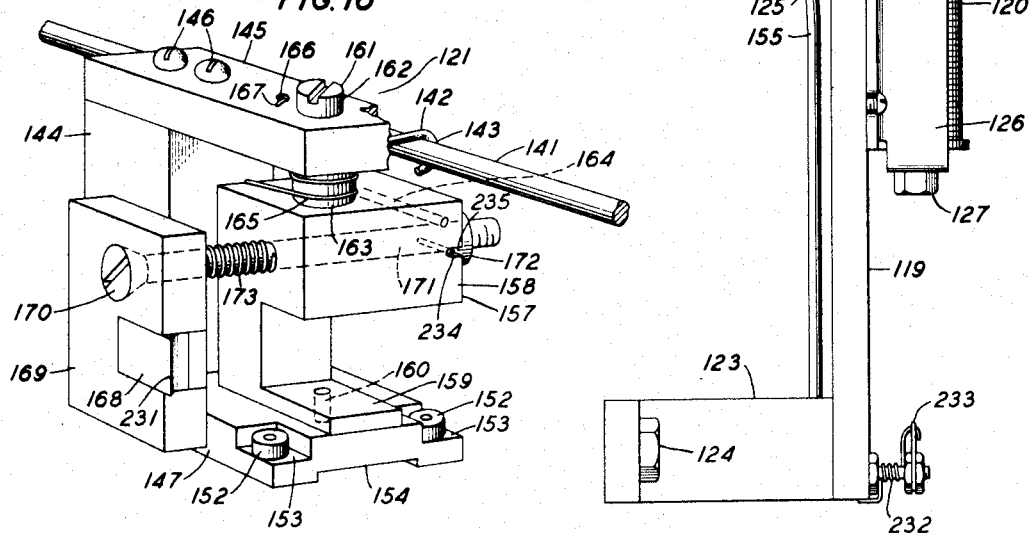
INVENTOR
R. G. McCOY
BY J. MacDonald
ATTORNEY Jan. 22, 1946. R. G. McCOY 2,393,548
WINDING MACHINE
Filed Sept. 1, 1944 9 Sheets-Sheet 9

INVENTOR
R. G. McCOY
BY J. MacDonald
ATTORNEY

Patented Jan. 22, 1946

2,393,548

UNITED STATES PATENT OFFICE 2,393,548

WINDING MACHINE

Robert G. McCoy, New York, N. Y., assignor to Bell Telephone Laboratories, Incorporated, New York, N. Y., a corporation of New York Application September 1, 1944, Serial No. 552,254

16 Claims. (Cl. 242—9)

This invention relates to a winding machine and more particularly to a machine for winding wire or other strand material onto a card-like support.

Card-like supports wound with wire are used as resistance elements in potentiometers and other electrical devices and in some cases the card-like support is not uniform in width from end to end but has one of its edges contoured to a required curve form. Conventional type winding machines are unsuitable for accurately winding wire onto card-like supports of some irregular forms required.

The object of this invention is to provide a machine by means of which a wire may be accurately wound onto a card-like support of irregular form.

The invention resides in a winding head in which improved means are provided for accurately winding and supporting each turn of wire in its required place on the card-like support.

One feature in the winding head resides in a cam operated semicircular plate which is one of a pair of semicircular plates and a movable bar carried by the cam operated plate and which cooperates therewith to guide each turn of wire to a required position on the card-like support and briefly hold each turn of wire in its required position on the card-like support when the edge of the card-like support is of a descending or receding slope form.

Another feature resides in a wire positioning device which has a wire positioning unit involving a finger device which operates to guide each turn of wire to its required place on the card-like support and support the turn of wire against slipping along the edge of the card-like support during the critical period of winding the turn of wire across the edge of the card-like support when the edge of the card-like support is of ascending form.

Another feature resides in means provided for controlling the operation of the above-mentioned finger device.

Another feature resides in a resilient guide device for guiding the wire against the semicircular plate during the critical instant of laying the wire onto the straight edge of the card-like support for the purpose of insuring proper wire position and spacing along the edge of the card-like support.

Another feature resides in a spool holder for a spool containing a supply of the wire, the spool holder being operable at variable speeds to rotate the spool of wire at variable speeds and to cause the spool to release wire from the spool at required rates during the operation of the winding machine.

Another feature resides in a brake device controlled by means of a flier arm and cooperating with the flier arm and a spool holder and spool to maintain a required tension on the wire while the wire is passing from the winding head onto the card-like support.

In the drawings:

Fig. 2 is a face view partly in section of the winding head and shows a card-like support on which the wire is being wound and parts of the means provided in the machine for supporting the winding head. Fig. 2 is taken from the left of the winding machine shown in Fig. 1 and is enlarged relative to the showing of the winding head in that figure;

Fig. 4 is an edge view of the winding head as seen from the front of the winding machine and shows a portion of a card-like support on which wire is being wound;

Fig. 5 is a partial cross-sectional view of the winding head shown in Figs. 3 and 4 and sectioned on the line 5—5 of Fig. 3;

Fig. 6 is an enlarged view of the semicircular plates in the winding head and taken from the right in Fig. 5;

Fig. 8 is a view, in reduced scale, of parts of the winding head taken on the line 8—8 of Fig. 2;

Fig. 9 is an enlarged view, in schematic, of a portion of a card-like support on which wire is being wound by means of the machine and shows a portion of one of the semicircular plates and the bar for briefly holding each turn of wire in place while the turn of wire is taking its position on the card-like support when the edge on the card-like support is of a descending character;

Figure 12:
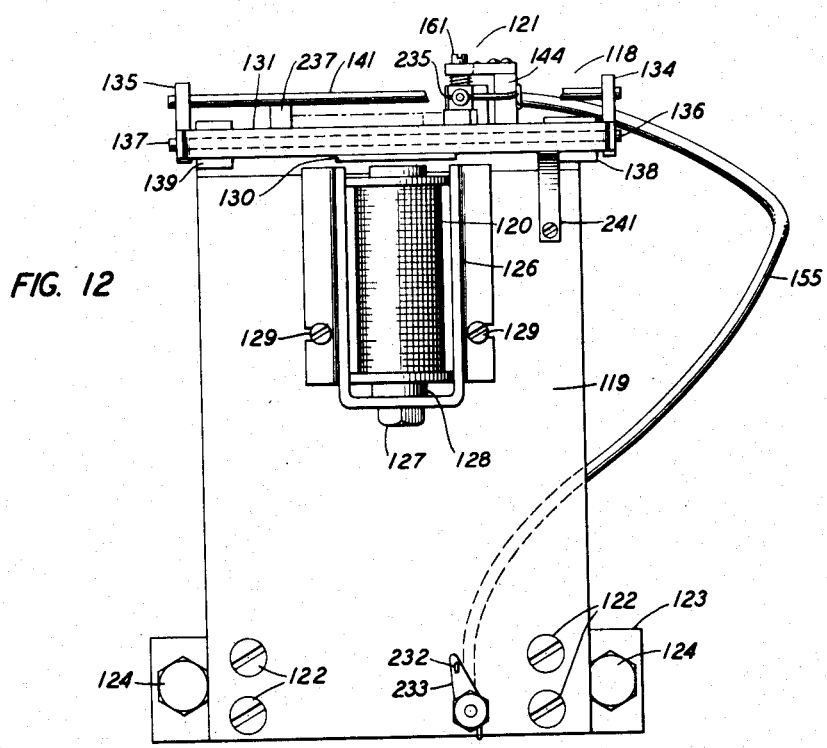
Figure 13:
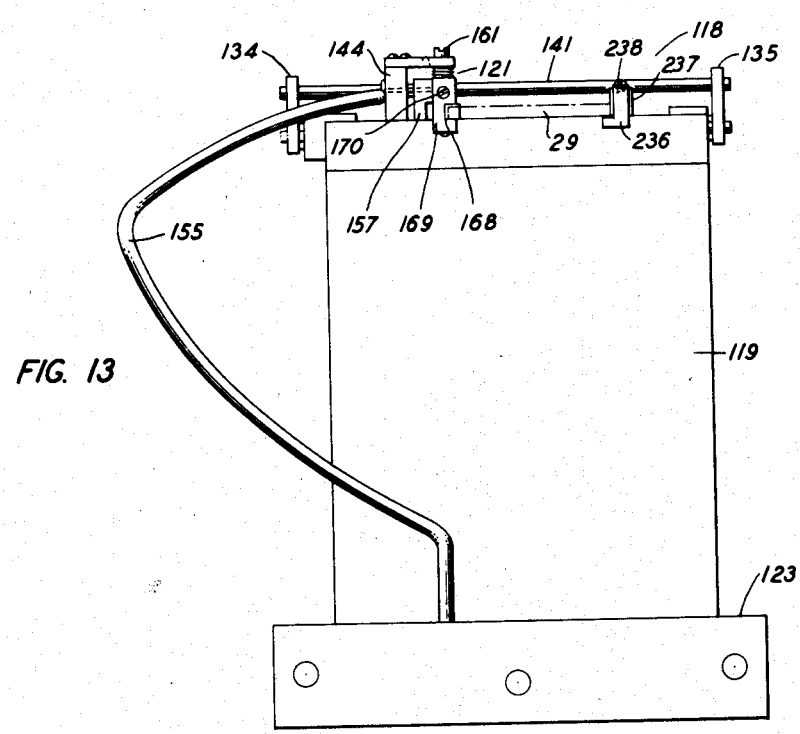

Fig. 10 is an enlarged view, in schematic, of a portion of a card-like support on which wire is being wound by means of the machine and shows the finger for guiding each turn of wire to its required place on the card-like support and holding the turn of wire in place during the critical period of winding the wire across an edge of the card-like support and when the edge on the card-like support is of an ascending character;

Fig. 11 is a front edge view of a bracket and devices supported thereon and involving an electromagnet and other means for operating the finger above mentioned;

Fig. 12 is another view of the bracket and devices shown in Fig. 11 and taken from the left of that figure;

Fig. 13 is still another view of the bracket and devices shown in Fig. 11 and taken from the right of that figure;

Fig. 14 is a rear edge view of the bracket and devices shown in Fig. 11;

Fig. 15 is a top plan view of the bracket and devices shown in Fig. 11 and shows in dot-dash lines a card-like support on which wire may be wound;

Fig. 16 is an enlarged view in perspective of the finger, the supporting means therefor and part of the means for operating the finger;

Figs. 17 through 29A are illustrations of certain parts employed in the winding head and show steps in the winding of the wire onto the card-like support and the relative positions taken by the parts during the operation. Some of the parts in these figures are shown in section, some are shown in reduced scale and some are shown in enlarged scale relative to other illustrations of the parts in the preceding figures in the drawings; and Fig. 30 shows a card-like support with wire wound thereon by means of the present invention.

In some precision electrical potentiometers now required, one of the parts of the potentiometer is a resistance element comprising a card-like support and a resistance wire wound on the card-like support. The resistance element is arranged for engagement by a wiper contact which successively engages each turn of resistance wire on the resistance element. The card-like support serves as an insulating support for the wire winding and in some cases the card-like support is made so that the width is not uniform throughout the length of the card-like support.

Figure 30:
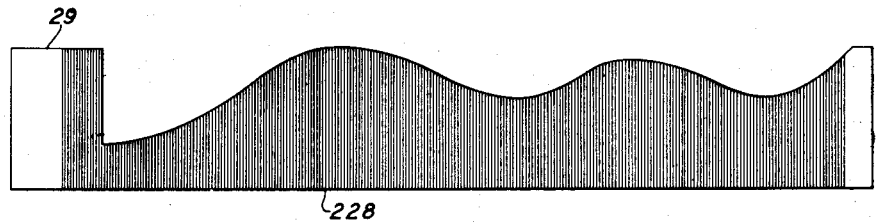

Fig. 30 illustrates one of the many forms of card-like supports wound with resistance wire and used as resistance elements in precision potentiometers. In this case one long edge of the card-like support is formed at some points so that it does not run parallel with the other long edge and is of wave-like pattern. The wave-like pattern of one long edge of the card-like support as viewed in Fig. 30, in effect runs uphill at some points and downhill at other points and it will be appreciated that when a resistance wire is being wound onto the card-like support and so that the turns of wire extend transversely of the run of the card-like support some means must be provided either on the card-like support or in the wire winding machine to insure that each turn of wire will take its required place on the card-like support and will not slip from its required position on the card-like support.

The card-like support may be made of any material suitable for the purpose but should be of such character at least on the long edge portions that when the wire is being wound on the card-like support under a suitable tension the turns of wire will be partly embedded in the long edge portions of the card-like support. It will be assumed, however, merely for the purpose of explaining the present invention and not in the sense of a limitation thereof that the card-like support is made of hard sheet rubber. The card-like support will also be hereinafter called a card and it will be understood that wherever the word "card" hereinafter appears in the specification and claims it means a card-like support suitable for serving as a support for a winding of wire or other strand material.

Figure 1:
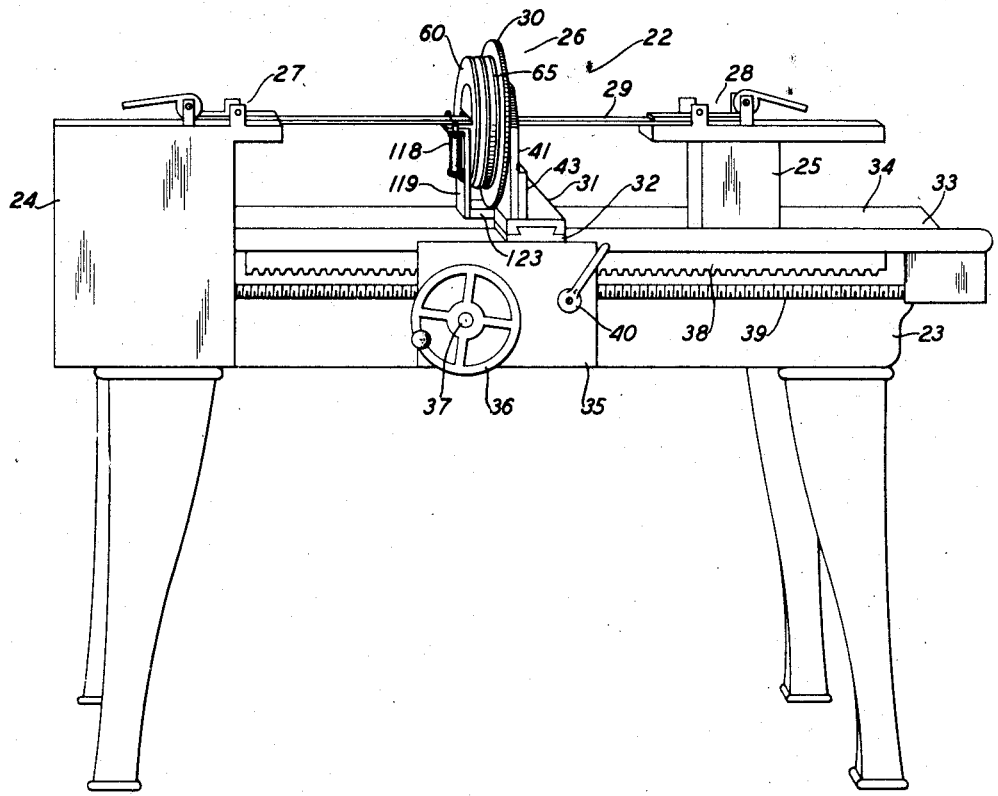
Fig. 1 is a front elevational view of the winding machine embodying some parts of the invention.

As shown in Fig. 1, the winding machine 22, embodying the present invention, follows the general pattern of a lathe comprising a bed 23, a head stock 24, a tail stock 25 and a winding head 26. The head stock 24 and tail stock 25 are equipped with clamps 27 and 28 respectively for holding a card 29 in suitable position for wire to be wound thereon by means of the winding head 26. The head stock 24 contains a system of gears, not shown, for imparting movement to certain parts of the winding machine and may also contain a driving motor for the machine.

When a card 29 is to be wound with wire, the card 29 is clamped in place in the machine 22 by means of the clamps 27 and 28 and so that the card 29 extends between the head stock 24 and the tail stock 25 and in parallel spaced relation with the bed 23. The card 29 is held stationary in this position while the winding head 26 is operated to wind the wire around the card 29.

The winding head 26 comprises a ring gear 30 and other parts which will be subsequently described and operable to wind the wire onto the card 29. Means are provided in the winding machine to cause relative movement of the winding head 26 and the card 29 so that as parts of the winding head 26 are rotated around the position of the card 29 the wire coming from the winding head 26 will be wound in successive turns onto the card 29. Various means may be provided to cause relative movement of the winding head 26 and the card 29 without departing from the spirit of the present invention. For instance, means might be provided to move the card 29 longitudinally while the winding head 26 remains in a certain position and while parts of the winding head 26 are rotated around the card 29, or as shown in the drawings, the card 29 might be held stationary while the winding head 26 is driven along the length of the card and parts of the winding head 26 are rotated around the card 29.

The winding head 26, as shown in Figs. 1, 2, 3, 4 and 5, comprises a base 31 adjustably mounted on a platform 32 extending transversely across the bed 23 and resting on and slidable along tracks 33 and 34 formed on the bed 23. An apron 35 secured to the platform 32 and extending downwardly thereof is provided with means to manually and automatically move the platform 32 along the bed 23. The means for manually moving the platform 32 along the bed 23 comprises a manually operated wheel 36 which is supported on a rotatable shaft 37 on an end of which is a pinion, not shown, but engaging a rack 38 extending along the front of the bed 23. For automatic movement of the platform 32 along the bed 23 a clutch, not shown, but supported on the apron 35 is provided to releasably engage a lead screw 39, the clutch being operable by means of the handle 40 to mechanically connect the apron 35 to the lead screw 39 and the lead screw 39 being gear connected at one end to the driving gears in the head stock 24.

Figure 3:
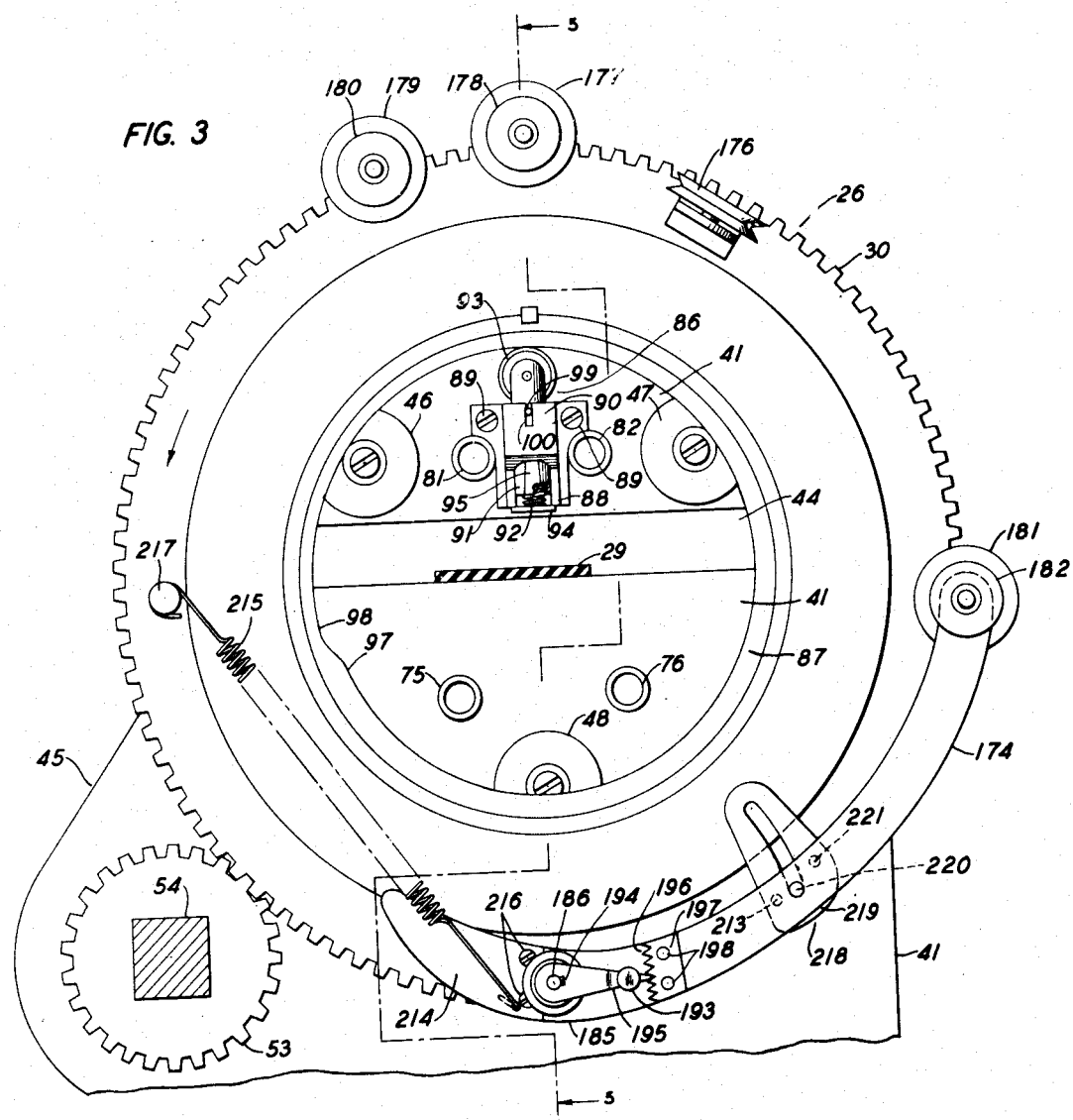
Fig. 3 is a view corresponding to Fig. 2 but with some of the parts removed and other parts in different positions.

Mounted on and extending upwardly from the base 31 is a frame 41 which is secured at its lower end by means of screws 42 to an upright flange 43 on the base 31. As shown in Figs. 3 and 5 the frame 41 is apertured at 44 to permit extension through the frame 41 of the card 29. An apertured extending portion 45 on the frame 41 and shown in Figs. 2 and 3 provides a support for certain other parts of the winding head which will be subsequently explained.

The ring gear 30 is spaced from and is rotatable relative to the frame 41 and is supported by means of three wheels 46, 47 and 48 which are grooved on their peripheral portions to receive a double beveled edge 49 shown in Fig. 5 and formed on the inner annular surface of the ring gear 30. The wheels 46, 47 and 48 are individually mounted on low friction-type bearings 50, each of which is mounted on a screw bolt 51 supported in a bushing 52 mounted in an aperture provided in the frame 41. The ring gear 30 is rotatably driven by means of a pinion 53, Fig. 2, which is rotatably supported on a low friction-type bearing, not shown, but supported and mounted in an aperture in the extending portion 45 of the frame 41. The pinion 53 is apertured to accommodate a driving shaft 54 which is non-circular in cross-section so that rotations of the driving shaft 54 will be imparted to the pinion 53 and the pinion 53 may slide lengthwise of the driving shaft 54 when the winding head 26 is moved along the bed of the machine. The driving shaft 54 is supported along the rear of the bed of the machine and is rotated by means of the driving means for the machine when the machine is in operation. It will be seen, therefore, that when the machine is in operation the ring gear 30 is driven by means of pinion 53 and turns around the position of the card 29.

Mounted at spaced points on the ring gear 30 are wheels 55 only one of which is shown in Fig. 5, each wheel being supported on a low friction type bearing 56 mounted on a bolt 57 extending through a bushing 58 supported in an aperture provided in the ring gear 30. The wheels 55 may be made like the wheel 48 or may be double beveled on the periphery and serve to rotatably support an annular spool holder 59 which serves as a support for a spool 60. The wheels 55 engage in an annular groove 61 formed in the inner surface of the spool holder 59 and rotatably support the spool holder 59 so that it may be rotated relative to the ring gear 30.

The spool holder 59 in addition to serving as a support for the spool 60 also serves as part of a brake system and comprises an annular body member 62 and an annular boss 63 of smaller diameter than the body member 62, the boss 63 being connected to the body member 62 by a flat flange 64 against the outer surface of which one of the flanges on the spool 60 may rest. The outer annular surface of the body member 62 is grooved to form a brake drum 65 which is frictionally engaged by a brake device to be subsequently described.

The spool 60 comprises a barrel portion 66 and the spool heads 67 and 68 and serves as a support for a supply of wire 69, some of which is to be wound on the card 29 by operation of the winding machine. When the spool 60 is placed in required position on the spool holder 59 the spool head 67 rests against the outer face of the flange 64 and the barrel portion 66 is secured to the boss 63 by means of a key 70.

It will be seen that since the spool holder 59 is rotatably supported on the wheels 55 the spool holder 59 may be rotated at the same speed as the ring gear 30 or at a different speed from that of the ring gear 30 or may be held against rotation while the ring gear 30 continues to rotate. The spool holder 59 may also be rotated reversely relative to the direction of rotation of the ring gear 30.

Two substantially semicircular plates 71 and 72 are located in the space defined by the boss 63 and so that the two plates are normally in a common plane and wide base portions of the plates are toward each other and slightly spaced apart, the spacing being a little more than sufficient to accommodate the thickness of the card 29. The plate 71, as shown in Figs. 5 and 6, is equipped with spaced stud bolts 73 and 74 which are mounted on the inner face of the plate 71 and extend normal to the plane of the inner face. The stud bolts 73 and 74 extend through sleeves 75 and 76 respectively, which are supported on the frame 41 and extend normal to the plane of the inner face of the frame 41 as shown in Fig. 3. A nut 77 and a washer 78 are provided on each stud bolt 73 and 74 to cooperate with the stud bolts in holding the plate 71 in required position as shown in Fig. 5.

The plate 72 is equipped with spaced stud bolts 79 and 80 which are mounted on the inner face of the plate 72 and extend normal to the plane of the inner face. The stud bolts 79 and 80 extend through sleeves 81 and 82 respectively, which are supported on the frame 41 and extend normal to the plane of the inner face of the frame 41. The stud bolts 79 and 80 are each equipped with a nut 83 and a washer 84 and on each of these stud bolts a helical spring 85 is mounted and located between the washer 84 and the outer face of the frame 41 to allow movement of the plate 72 relative to the frame 41. To impart movement to the plate 72 in one direction and against the action of the springs 85, a plunger device 86 and a cam ring 87 are provided. The plunger device 86 comprises a body 88 mounted on the inner surface of the frame 41 by means of screws 89 or other suitable fastening means, an apertured block 90, shown in Fig. 3, supported in and secured to the body 88, a plunger 91 supported in the block 90, a spring 92 to return the plunger 91 to normal position and a wheel 93 bearing against the cam ring 87. The lower end of the block 90 is partly cut away to expose the lower end portion of the plunger 91 which is substantially cylindrical in form. The returning spring 92 for the plunger 91 is disposed partly within the plunger 91 and extends into engagement with an end wall 94 formed on the lower end of the body 88. A cam surface 95 is formed on the lower portion of the plunger 91, the cam surface being in the form of an inclined plane with the low end at the lower end of the plunger 91 and the high end at the point where the lower portion of the plunger 91 emerges from the block 90. The cam ring 87 is securely mounted on spaced posts 96 which are securely mounted on the ring gear 30, the cam ring 87 being located within the space defined by the larger end portion of the spool holder 59 and being rotated by means of the ring gear 30. The inner edge of the cam ring 87 bears against the wheel 93 on the plunger device 86 as shown in Figs. 3 and 5 and operates the plunger 91 against the action of the return spring 92. The inner edge of the cam ring 87 which actuates the plunger 91 is in the form of a spiral which recedes in a counter-clockwise direction from the innermost point 97 for 350 degrees to the outermost point 98, the inner and outer ends of the spiral being joined in the remaining 10 degrees. The cam ring 87, therefore, has in effect a low spot at 98 and a high spot at 97 and it will be seen by looking at Fig. 3 that when the cam ring 87 is rotated in a counterclockwise direction the plunger 91 is gradually pressed downward against the action of the spring 92 until the high spot 97 on the cam ring 87 passes beyond the wheel 93. When the high spot 97 passes beyond the wheel 93 the spring 92 starts to restore the plunger 91 to normal position and this position is reached when the low spot 98 is in engagement with the wheel 93. A pin 99 mounted on the plunger 91 and operating in a slot 100 formed in the block 90 is provided to prevent rotation of the plunger 91 in the block 90.

As shown in Figs. 5 and 6, a wheel 101 mounted on a shaft 102 supported in spaced walls 103 and 104 is provided on the inner face of the plate 72. The wheel 101 is in engagement with the cam surface 95 on the plunger 91 and is held in engagement with the cam surface 95 by the action of the springs 85 on the stud bolts 79 and 80. When the plunger 91 is pressed downwardly the plate 72 is moved out of the plane of the plate 71 and toward the left of the normal position of the plate 72 shown in Fig. 5. The plate 72 is shown in Figs. 17A, 19A, 20A and 21A out of the plane of the plate 71. The plate 72 is returned to its normal position shown in Fig. 18A by action of the springs 85 when the plunger 91 returns to its normal position.

Supported on the inner face of the plate 72 and extending across the lower portion of the plate 72 is a track device 105 comprising an inwardly extending flange 106 on the plate 72 and a channel bar 107. The channel bar 107 is substantially J-shaped in cross-section and is so mounted on the inner face of the plate 72 that it cooperates with the flange 106 on the plate 72 to form a runway for a relatively small carriage 108 which is T-shaped in cross-section and provided with four wheels 109 supported on the cross arm section, two of the wheels 109 being arranged in engagement with the channel bar 107 and the other two being arranged in engagement with the inner face of the plate 72 directly above the flange 106. The lower portion 110 of the carriage 108 extends downward through the track device 105. Supported on the lower portion 110 of the carriage 108 and operating in a space 111 between the plates 71 and 72 is a bar 112 secured to the carriage 108 by means of screws 113. The carriage 108 is continually urged in one direction along the track device 105 by means of a spring motor device 114 and a tow line 115. The spring motor device 114 is supported on the inner face of the plate 72 by means of a screw 116 and somewhat above the position of one end portion of the track device 105. One end of the tow line 115 is secured to the carriage 108 and the other end is secured to a rotor, not shown, but provided in the spring motor device 114. Supported in one end of the track device 105 is a pulley 117 around which the tow line 115 extends, the pulley 117 being positioned as shown in Fig. 6 so that when the spring motor device 114 operates to pull the tow line 115 the carriage 108 will be urged in a right-hand direction from the position shown in Fig. 6.

As mentioned in the fifth paragraph of this specification one feature in the winding head resides in a cam operated semi-circular plate and a movable bar which cooperate to guide each turn of wire to a required position on the card when the edge of the card is of a descending or receding slope form. The plate and bar referred to are respectively the plate 72 and the bar 112 above described and these parts cooperate to support and guide each turn of the wire while the wire is being wound on the card 29. The manner in which the parts cooperate will be subsequently described.

In Figs. 1, 4, 11, 12, 13, 14 and 15 a wire positioning device 118 is shown and this wire positioning device 118 as shown in Figs. 1 and 4 is mounted on the base 31 of the winding head 26.

The wire positioning device 118 comprises a vertical plate type support 119, an electromagnet 120 and a wire positioning unit 121, an enlarged view in perspective of the wire positioning unit 121 being shown in Fig. 16. The plate type support 119 is secured at its lower end by means of screws 122 to a bracket 123 which is secured by means of screws 124, as shown in Fig. 4, to one side of the base 31 of the winding head 26. A horizontal top portion 125 on the support 119 serves as a support for the wire positioning unit 121 and certain other parts of the device 118.

The coil portion of the electromagnet 120 is supported in a flanged U-shaped holder 126 and is secured thereto by means of a screw 127 which extends through the closed end of the holder 126 and through a spacer 128 and into the lower end of the core of the electromagnet 120. The holder 126 is secured to the outer flat surface of the support 119 by means of screws 129. An armature 130 of the electromagnet 120 is secured to a yoke 131, the ends 132 and 133 of which are welded or otherwise secured to edge portions of the flat bars 134 and 135 respectively, which are pivotally supported on pins 136 and 137 mounted in and extending from blocks 138 and 139 secured by means of screws 140 to the horizontal top portion 125 on the upper end of the support 119. The flat bars 134 and 135 extend upwardly from the ends of the yoke 131 to form in cooperation with the ends of the yoke 131, in effect, bell crank levers at each end of the yoke 131. Bridged across the space between the upper ends of the flat bars 134 and 135 and secured thereto is a rail 141 in hooked engagement with which is an L-shaped arm 142, one end of the arm 142 having a hook-shaped end portion 143 which is hooked over and in engagement with the rail 141. The arm 142 forms a mechanical connection between the rail 141 and the wire positioning unit 121 and serves to transmit movement of the armature 130 of the electromagnet 120 to a movable part of the wire positioning unit 121.

The electromagnet 120 may be energized from any suitable source of current supply, not shown. The operation of the electromagnet is controlled by means of a switch, not shown, but which is operated to close a circuit to the electromagnet 120 for a brief interval during the application of each turn of wire 69 to the card 29. The switch for controlling the electromagnet 120 may be controlled by means of the drive shaft 54 or some other cyclically rotating part of the winding machine, the only condition being that the switch will momentarily close to cause energization of the electromagnet 120 at the required time when each turn of the wire 69 is being applied to the card 29.

The wire positioning unit 121, as shown in Figs. 11 to 16 inclusive, comprises a body 144 having an arm 145 secured to the top by means of screws 146 and extending in parallel spaced relation with a base 147 which is slidably mounted on the the wheels 152 being located in recesses 153 the base 147 being constructed to slidably rest in a track 148 formed in the horizontal top portion 125 of the support 119, the track 148 being cooperatively formed by an undercut side 149 in the top portion 125 and an angle strip 150 secured by means of screws 151 to the top portion 125. Four wheels 152 are rotatably mounted on the base 147 to engage the side walls of the track 148, the wheels 152 being located in recesses 153 formed in the corner portions of the base 147 and being arranged so that the peripheral portions of the wheels 152 will engage the sides of the track 148. The under surface of the base 147 is recessed at 154 to reduce the friction of the base 147 on the track 148. A comparatively light stem 155 is provided to urge the body 144 in one direction along the track 148. The type and form of stem employed for the purpose is a matter of choice but may comprise as shown in the drawings a comparatively stiff wire pivotally mounted at its lower end and having its upper portion 156 extending longitudinally within the track 148 and so that the free end of the stem 155 thrusts against the back of the body 144. The lower end of the stem 155 extends angularly of the main portion and through the support 119 and is journaled therein and provided with a spring 232 to urge the stem 155 against the body 144, the spring 232 having one end engaging a lever 233 mounted on the stem 155 and the other end of the spring 232 being in holding engagement with the support 119.

A turn block 157 is disposed in the space between the arm 145 and the base 147 of the body 144, the turn block 157 having a relatively large upper portion 158 extending in parallel spaced relation with a smaller lower portion 159. The turn block 157 is pivotally supported in the body 144 by means of a pin 160 and a screw 161, the pin 160 extending from the lower portion 159 of the turn block 157 and into the base 147 of the body 144 and the screw 161 extending through the arm 145 and into the upper portion 158 of the turn block 157, the screw 161 having a cylindrical head member 162 which is journaled in an aperture formed in the arm 145. A tubular spacer 163 is supported on the screw 161 and located between the turn block 157 and the undersurface of the arm 145. The turn block 157 is pivotally turned in one direction under the action of the rail 141 when the electromagnet 120 is energized, the turn block 157 being mechanically connected to the rail 141 by means of the arm 142, one end 164 of which is extended into and anchored to the upper portion 158 of the turn block 157. When the electromagnet 120 is de-energized the turn block 157 is returned to normal position by means of a coil spring 165 supported on the tubular spacer 163, one end of the spring 165 being in hooked engagement with the back of the turn block 157 and the other end of the spring 165 being extended through an aperture 166 formed in the arm 145 of the body 144 and bent over as shown at 167. The armature 130 and the yoke 131 are returned to normal position by means of a spring 241 which may be secured at one end to the support 119 and have engagement with the yoke 131. It will be seen as shown in Fig. 16 that when the turn block 157 is rotated under the action of the rail 141 the spring 165 will be wound up and that when the pull on the rail 141 is discontinued the spring 165 will restore the turn block 157 to normal position. It will also be seen in Fig. 16 that since the only mechanical connection between the wire positioning unit 121 and the rail 141 is by virtue of the hook-shaped end 143 of the arm 142, the wire positioning unit 121 may be moved lengthwise along the track 148 and along the rail 141 under the thrusting action of the stem 155 which is urged against the body 144 by means of the spring 232.

The wire positioning unit 121 is equipped with a finger 168, the function of which is to guide each turn of wire to its required place and briefly hold each turn of wire in its required place on the card 29 where the edge on the card 29 is of ascending form. The different positions taken by the finger 168 while the wire is being wound on the card 29 are shown in Figs. 22A to 29A inclusive. The finger 168 as shown in Fig. 16 is mounted in a plate 169 which is supported on a bolt 170, the threaded shank portion 171 of which extends transversely through the upper portion 158 of the turn block 157 which is drilled to receive the shank portion 171 of the bolt 170. A nut 172 is provided on the bolt 170 to prevent withdrawal of the bolt 170 from the turn block 157 and to serve as an adjustable stop to limit the distance of separation of the plate 169 from the turn block 157 and from the plate 72. A coil spring 173 which is mounted on the bolt 170 and located between the turn block 157 and the inner face of the plate 169 serves as a compressible spacer between the turn block 157 and the plate 169. The bolt 170 is provided with a radially extending pin 234 which rides in a slot 235 formed in the upper portion 158 of the turn block 157 to prevent rotation of the bolt 170. The manner in which the wire positioning unit 121 operates will be subsequently explained.

A spring guide 236 is provided to resiliently and separately engage the turns of wire on the straight edge of the card 29. The spring guide 236 is mounted on an inverted T-shaped support 237 which is adjustably held in the track 148 by means of a screw 238. The spring guide 236 is L-shaped and one free leg portion extends in parallel spaced relation with the support 237 and in close spaced relation with and transversely across the straight edge of the card 29.

To maintain the wire under suitable tension while the wire is being wound onto the card 29, wire tensioning means and a brake system cooperating therewith are provided in the winding head 26 and the wire tensioning means and the brake system will now be described.

The wire tensioning means as shown in Figs. 2, 3, 4 and 8 comprise a flyer arm 174 and a system of pulleys 175 comprising the pulleys 176, 177, 178, 179 and 180 carried by the ring gear 30 and the pulleys 181 and 182 carried on the flyer arm 174. The pulleys 176, 177, 178, 179 and 180 are mounted in spaced relation and are located in advanced positions relative to the pulleys 181 and 182 and all pulleys are provided with low friction type bearings so that the pulleys are freely rotatable. The wire 69, as shown in Fig. 2, is led from the spool 60 and is trained through the system of pulleys 175 in a system of loops two of which are changeable in length under the action of the flyer arm 174, the wire 69 after its passage through the system of pulleys 175 being finally guided by means of the plates 71, 72, the bar 112, finger 168 and the spring guide 236 to the required points on the card 29 during the winding operation. The course of the wire 69 from the spool 60 to the card 29 is optional in some respects but should be such that the wire will be fed to the required point on the card 29 and will be maintained taut in its passage from the spool 60 to the card 29. One of several possible courses for the wire 69 is shown in Fig. 2, the direction in which the wire 69 runs through the pulley system 175 being indicated by arrow-points drawn on the line indicating the wire 69. In this case the wire 69 coming from the spool 60 passes over and in engagement with the pulley 177 and after passing part way around the pulley 177 proceeds through the peripheral grooves in the other pulleys in the system of pulleys 175 in the following manner, from pulley 177 to pulley 176, to pulley 178 which is mounted in parallel spaced relation with the pulley 177, from pulley 178 to pulley 181, supported on the flyer arm 174, thence to pulley 180 which is in an advanced position relative to pulleys 177 and 178, from pulley 180 to pulley 182 on the flyer arm 174 and in parallel spaced relation with pulley 181, from pulley 182 to pulley 179 and thence downward to the card 29. It will be seen that there are two loops in the wire pattern which are under control of the flyer arm 174, one loop being identified as 183 and the other being identified as 184, the loop 183 being where the wire 69 passes from the pulley 178 to the pulley 181 and from thence to the pulley 180 and the loop 184 being where the wire 69 passes from the pulley 180 to the pulley 182 and from thence to the pulley 179. The loops 183 and 184 shorten during certain times and lengthen during certain other times in the operation of winding the wire 69 on the card 29 and one function of the flyer arm 174 is to cooperate with certain other parts in the winding head 26 to maintain the wire 69 taut during its passage from the spool 60 to the card 29.

The flyer arm 174 is pivotally supported at one of its end portions and so that the end portion on which the pulleys 181 and 182 are carried may move towards and away from the pulleys 177, 178, 179 and 180 and in a plane parallel with the plane of the ring gear 30. The flyer arm 174 at its pivotally supported end portion 185 is supported, as shown in Fig. 8, on a flanged rotatable bushing 239 supported in a sleeve bearing 240 which extends through an apertured plate 187 supported on a block 188 mounted on the front face of the ring gear 30. A shaft 186 extends through the parts 239 and 240 and supports a cam 189 having an apertured boss 190 which is secured to one end of the shaft 186 by means of a tapered pin 191, the cam 189 being rotatable when the shaft 186 is rotated. The outer end of the shaft 186 as shown in Figs. 2, 3 and 8 is staked or otherwise secured as shown at 194 to a pointed lever 195, the pointed end of which is engageable in the teeth 196 of a toothed plate 197 which is secured by means of rivets 198, 198 or other suitable fastening means to the flyer arm 174. The toothed plate 197 and the pointed lever 195 form a mechanical connection between the flyer arm 174 and the shaft 136. When the flyer arm 174 is pivotally moved the shaft 186 is rotated to cause rotation of the cam 189 to control the operation of a brake device 199 which is operable to reduce the speed of or stop rotation of the spool holder 59 and the spool 60 and thus change the speed of rotation of the spool 60 relative to that of the ring gear 30.

Figure 7:
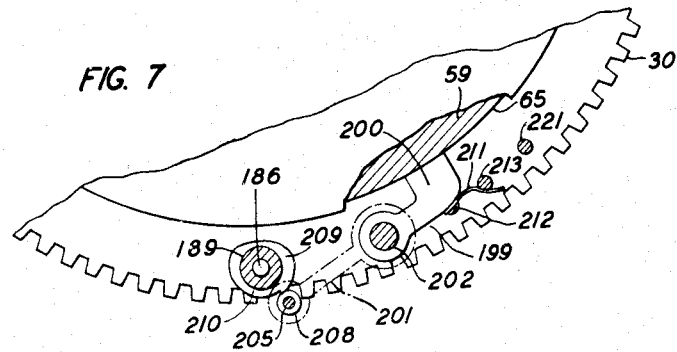
Fig. 7 is a view, partly in section, of a portion of a ring gear and a portion of a brake drum provided in the winding head and shows parts of a brake mechanism operable on the drum.

The brake device 199 as shown in Figs. 7 and 8 comprises a lever type brake shoe 200 and a lever 201 pivotally supported on the shank of a screw 202 mounted on the ring gear 30. The brake shoe 200 is spaced from the ring gear 30 by means of an annular spacer 203 and is mechanically connected at its pivotally supported end to the pivotally supported end of the lever 201 by means of a boss 204. Supported on the free end of the lever 201 is a pin 205, secured in place by means of the nuts 206 and 207. The pin 205 supports a roller 208 which is engageable with the periphery of the cam 189 which, as shown in Fig. 7, has a high portion 209 abruptly terminating at one end in a low portion 210. When the roller 208 is on the high portion 209 of the cam 189 the free end of the brake shoe 200 is pressed against the brake drum 65 against the action of a restoring spring 211, one end of which is secured at 212 to the brake shoe 200, the free end portion of the spring 211 having bearing engagement with a post 213 mounted on and extending normal from the face of the ring gear 30. It will be seen as shown in Fig. 7 that when the high portion 209 of the cam 189 is in engagement with the roller 208 the brake shoe 200 bears against the brake drum 65 to retard rotation of the spool holder 59 and that the spring 211 is flexed so that spring pressure is developed therein. It will also be seen that when the cam 189 is rotated counter-clockwise to bring the low portion 210 of the cam 189 adjacent the roller 208 the restoring spring 211 will cause movement of the brake shoe 200 away from the brake drum 65. Initial setting of the cam 189 may be such that the low portion 210 of the cam 189 is adjacent the roller 208 when the flyer arm 174 is in the position shown in Fig. 2 and so that a slight rotation of the cam 189 in a clockwise direction will bring the high portion 209 of the cam against the roller 208. The high portion 209 of the cam 189 extends a considerable distance at a constant radius from the pivot in a counter-clockwise direction from its point of termination in the low portion 210 and then gradually merges with the low portion 210. In Fig. 7 the brake shoe 200 is in maximum braking position and will be in maximum braking condition for any position of the flyer arm 174 clockwise from a position somewhere near that shown in Fig. 2. The initial setting of the cam 189 may be changed, however, by grasping the handle 193 and moving the pointed lever 195 shown in Fig. 3 so that the pointed end of the lever 195 engages one of the other teeth in the toothed plate 197. This adjustment changes the angle of the flyer arm 174 at which the cam 189 outwardly moves the brake roller 208.

Since the shaft 186 on which the cam 189 is supported is mechanically connected to the flyer arm 174 by means of the pointed lever 195 and the toothed plate 197, the cam 189 is rotated when the flyer arm 174 is pivotally moved. The cam 189 is formed and arranged so that when the free outer end of the flyer arm 174 is moved from the transition or equilibrium position shown in Fig. 2 towards the center of the ring gear 30 the cam 189 is rotated in a counter-clockwise direction so that the high portion 209 is moved beyond the roller 208; the brake shoe 200 and the lever 201 are pivotally moved in a clockwise direction under the action of the spring 211 to release the brake shoe 200 from engagement with the brake drum 65. When the flyer arm 174 and in consequence the cam 189 are rotated in a clockwise direction to bring the high portion 209 of the cam 189 in engagement with the roller 208 the lever 201 and the brake shoe 200 are operated so that the brake shoe 200 engages the brake drum 65 to stop the rotation of the spool holder 59 and the spool 60.

The brake device 199 is operated by means of the flyer arm 174 which swings towards or away from the position of the pulleys 179 and 180 during the operation of winding the wire 69 on the card 29. The flyer arm 174 is equipped with a counterweight 214 and a return spring 215. The counterweight 214 is secured by means of screws 216, 216, or other suitable fastening means to the pivotally supported end portion of the flyer arm 174, the construction and arrangement being such that the counterweight 214 will operate to balance centrifugal outward pull of the free end portion of the flyer arm 174. The return spring 215 is attached at one end to the counterweight 214 and the other end of the return spring 215 is secured to a pin 217 mounted on the ring gear 30, the arrangement being such that the return spring 215 will constantly urge the long free end portion of the flyer arm 174 away from the position of the card 29 to hold the wire 69 under required tension in the passage of the wire 69 from the spool 60 to the card 29. Undue outward or inward movement of the flyer arm 174 is prevented by means of a stop device 218 comprising an apertured plate 219 and a pin 220, the pin 220 being mounted on the flyer arm 174 and the plate 219 being mounted on the posts 213 and 221 supported on the ring gear 30. The angle formed by the central axis of the spring 215 and a line connecting the arm pivot of the spring with the pivot of the arm 174 is normally slightly less than 90 degrees as shown in Fig. 2. This causes the moment of the spring to decrease as the arm is moved inward due to the decrease of the above-mentioned angle and consequent decrease of the perpendicular distance between the line of pull of the spring and the arm pivot. This decrease in moment compensates for increase of spring tension as the spring 215 is stretched and the effective tension remains constant throughout the travel of the arm 174.

The plates 71 and 72 as shown in Fig. 2 are provided with embossings 222 and 223 respectively, extending outwardly of the front faces of the plates 71 and 72 and located along the relatively wide edge portions of the plates 71 and 72. The embossing 222 on the plate 71 is continued at one end into a tab 224 and the embossing 223 on the plate 72 is continued at one end into a tab 225, tab 224 being extended upwardly beyond the embossing 223 on the plate 72 and tab 225 being extended downwardly beyond the embossing 222 on the plate 71. The plate 71 is notched out at 226 to accommodate the tab 225 and a corresponding notch is provided at 227 in the plate 72 to accommodate the tab 224.

In order to wind the wire 69 on the card 29, the card 29 is mounted in the machine as shown in Fig. 1, the card 29 being clamped in place at its ends by means of the clamps 27 and 28 and so that the card 29 extends through the winding head 26 in such position that the ring gear 30 encircles the axis of the card 29. The wire 69 is led from the spool 60 through the system of pulleys 175 and to the card 29 in the directions indicated by the arrow points shown in Fig. 2. One end of the wire 69 may be manually held on a required point for starting the winding of the wire on the card 29 or may be secured at the required starting point by fastening the end of the wire in place by means of adhesive tape or other suitable holding means, the winding head 26 having been manually moved by means of the wheel 36 along the bed 23 of the machine to the required position for starting the winding operation. The handle 40 is then operated to drive connect the apron 35 to the lead screw 39 and the machine is started so that the ring gear 30 turns about the position of the card 29 and the winding head 26 is moved lengthwise of the bed 23 under the action of the lead screw 39.

The direction of rotation of the ring gear 30 is indicated in Fig. 2 by an arrow shown on the ring gear 30 and it will be seen in this figure that that the wire 69 passes across edge portions of the card 29 and across relatively wide flat surfaces of the card 29 during the winding operation. It will also be seen that the distance between the pulley 179 and the instant point of application of the wire 69 to the card 29 changes during the winding operation. For example, the distance between the pulley 179 and the instant point of application of the wire 69 to the card 29 indicated at 229 in Fig. 2 is greater than when upon further rotation of the ring gear 30 the wire 69 is passing across the opposite edge of the card 29 at the point indicated at 230. The change in distance between the pulley 179 and the instant point of application of the wire 69 to the card 29 is due in most part to the transferring of the instant point of application of the winding from one edge of the card 29 to the opposite edge of the card 29. It is also due in some cases to the difference in width of the card 29 at points along the length of the card 29. When changes occur in the distance between the pulley 179 and the instant point of application of the wire 69 to the card 29 the rate of feeding of the wire 69 from the pulley 179 to the card 29 must increase or decrease to insure against over tensioning or under tensioning of the wire. The wire 69 is led from the spool 60 to the card 29 by a take-off mechanism involving the system of pulleys 175 and the flyer arm 174. The wire 69 is led from the spool 60 in a clockwise direction to the pulley 177.

The take-off mechanism as bounded by pulleys 177 and 179 may take up or give out wire from either end, each end being somewhat independent of the other. The spool 60 and the spool holder 59 may be rotated in the same direction as and at the same speed as, or faster or slower than the ring gear 30, the flyer arm 174 may be moved relative to the axis of the ring gear 30 and the brake device 199 may be operated to cooperate in maintaining the tension of the wire 69 practically constant during the passage of the wire from the winding head 26 to the card 29. The actions of the flyer arm 174 and consequently of the brake device 199, the spool holder 59 and the spool 60 are governed by the algebraic sum of the input to or output of the take-off. It will be seen by looking at Fig. 2 that the arm 174 is pulled by means of the wire 69 towards the axis of the ring gear 30. If the brake is marginally engaged, as shown in Fig. 7, when the arm 174 is pulled inward the brake device 199 will not apply a braking action to the spool holder 59, there is no direct driving connection between the ring gear 30 and the spool holder 59 and the only means of transmitting rotation of the ring gear 30 to the spool holder 59 and the spool 60 are through the wheels 55 carried around by the ring gear 30 and operable within the spool holder 59 and the wire system leading from the spool 60 to the card 29 by way of the system of pulleys 175. As the ring gear 30 begins to rotate there is a slight lag between the rotation of the ring gear 30 and the spool holder 59 and spool 60. There is also a slight inward movement of the outer end of the arm 174 at this time. The arm 174 begins to hunt for a condition of equilibrium, wire is withdrawn from spool 60, the spool holder 59 begins to rotate in the same direction as the ring gear 30 and gradually increases in speed until the take-off mechanism is in equilibrium and the wire 69 is running from the spool 60 to the card 29 at the required rate.

As the ring gear 30 rotates and the winding head 26 is moved along the bed of the machine, the wire 69 is wound on the card 29. When the arm 174 moves outwardly to a predetermined point the cam 189 is rotated to operate the lever 201 to cause the brake shoe 200 to bear against the brake drum 65 to slow down the rotation of the spool holder 59 and hence the spool 60 relative to the ring gear 30.

During the instants when the lead-off edge of the pulley 179 is passing in level with the plane of the card 29 and is proceeding past an edge of the card as shown in Fig. 18 and during parts of the cycle when the pulley 179 is in effect rounding an edge of the card 29, the take-off is not appreciably giving or receiving wire. At other times the take-off is appreciably giving out or receiving wire at the pulley 179. At the pulley 178 the take-off will receive wire whenever the brake is released and the tension of the wire 69 overcomes the friction of the spool holder 59 on its wheels 55, or whenever the brake 199 is operating and has not stopped the relative rotation between the ring gear 30 and spool holder 59. The take-off will release wire to the pulley 178 when the brake is released and there is deceleration of the ring gear 30 which creates a torque in the spool greater than that caused by the tension. With the wire 69 coming off the spool 60 in a clockwise direction to the pulley 177 as shown in Fig. 2, so that pulling wire from the spool 60 requires, in effect, clockwise relative relation between the spool 60 and the ring gear 30 wire will be released from the take-off to the spool 60 during rapid deceleration of the speed of the ring gear 30. Rapid deceleration during the winding operation is less likely to occur than rapid acceleration. With the take-off arranged as in Fig. 2 the wire 69 may feed out from the spool 60 quite rapidly during the initial turning of the ring gear 30 in a counter-clockwise direction when the winding machine is started and will therefore not impair rapid acceleration of the machine to normal speed.

When the sum of the take-off's intake is positive, the arm 174 moves outwardly and when the sum of the intake is negative, the arm 174 moves inwardly. When the arm 174 moves outwardly or inwardly beyond the transition point between zero and 100 per cent braking at the step on the cam 189, the brake 199 is automatically operated to restore the system to equilibrium at the transition point. By adjusting the pointed lever 195 to required positions on the toothed plate 197 the equilibrium of the system may be set as required. So long as the arm 174 does not hit its stops, the tension on the wire 69 is maintained at the desired value, except as affected in a very minor way by pivot friction and force required to operate the brake 199. One end of the wire 69 is fastened to the card 29 and presents no problem in maintaining this tension unless it breaks. The tension at the other end which is fastened to the sometimes freely rotating spool 60 must be the same. The torque caused by the tension is, therefore, always equal to the sum of the torque caused by the brake 199, spool holder wheel friction which is constant, and the torque due to acceleration or deceleration of the spool holder 59.

During the winding of each turn of the wire 69 on the card 29 the plates 71 and 72 serve to steady the card 29 at the instant point of winding and also aid somewhat in guiding the turn of wire to its required place on the card 29. The plate 71 is maintained in constant spaced relation with the frame 41 and moves at constant speed along the under surface of the card 29 while the machine is in operation. The wire 69 is guided against the embossed edges of the plates 71 and 72 by the finger 168 as shown in Figs. 23A and 29A and to the required position on the front edge 229 of the card 29 by the finger 168 and the bar 112. On the rear edge 230 of the card 29 (the straight edge) the wire 69 is guided in place by means of the resilient finger 236. The plate 72 is thrust away from the frame 41 and out of the plane of the plate 71 once for every cyclic movement of the ring gear 30. The plate 72 is operated by means of the plunger 91, the cam surface 95 of which bears against the wheel 101. The plunger 91 is operated by means of the cam ring 87 bearing on the wheel 93, the plunger 91 being depressed when the high spot 97 on the cam ring 87 comes into engagement with the wheel 93. The plunger 91 gradually moves downward under the action of the cam ring 87 and against the thrust of the restoring spring 92 starting at the position shown in Fig. 18 when the wire 69 is passing over the forward edge 229 of the card 29 and continuing until the position shown in Figs. 17 and 21. Under this condition the plate 72 is thrust further away from the frame 41 and beyond the plane of the plate 71. The movement of the plate 72 is against the action of the springs 85 which restore the plate 72 to the same plane as the plate 71 when the high spot 97 on the cam ring 87 passes beyond the wheel 93. The cam ring 87 is formed and positioned so that the low spot 98 engages the wheel 93 just before the wire 69 is laid across the lower side of the contoured edge of the card 29. From then, for 350 degrees of counter-clockwise rotation of the ring gear 30, the plate 72 is gradually thrust beyond the plane of the plate 71 to guide and support the turn of wire being laid on the card 29. The plate 72 carries the bar 112 into position to guide and support the turn of wire 69 during the critical period of winding the turn of wire across the contoured forward edge 229 of the card 29. The cam ring 87 is shaped so that it operates to cause the plate 72 to be moved out of the plane of the plate 71 at the same rate as the platform 32 is normally moved along the bed 23 of the machine. Since the winding head 26 is being moved in one direction along the bed 23 of the machine and along the card 29 and during part of this time the plate 72 is being thrust in the opposite direction and at the same rate as the platform 32, the effect is that for 350 degrees of rotation of the ring gear 30 the plate 72 and bar 112 do not move relative to the card 29 and the wire 69 which has been laid on the card, while the plate 71 is moving relative to the card 29.

The bar 112 extends transversely of the embossing 223 and to the outer face thereof and operates in the space 111 between the plates 71 and 72 and rides along the forward edge 229 of the card 29 when the plate 72 returns to the plane of the plate 71. If the card width is increasing, the bar 112 will be moved to accommodate the increasing width of the card 29 since the bar 112 is mounted on the carriage 110 operating in the track 105 against the action of the spring motor 114 and the tow line 115. If the card width is decreasing, the bar 112 is held against the forward edge of the card 29 by the action of the spring motor 114. The bar 112 as shown in Fig. 9 engages and helps support each turn of wire 69 as the wire 69 comes across the front edge 229 of the card 29. In Fig. 9 the bar 112 is in engagement with the last turn of the wire 69 being wound on the card 29 and it will be seen, therefore, that the last turn of the wire 69 cannot slip along the narrowing portion of the card 29, also, that the embossing 223 on the plate 72 is in required position for guiding the wire 69 to its required place on the card 29 when the wire 69 is being laid across the upper surface of the card 29. After the turn of wire 69 is laid across the upper face of the card 29 and partially across the lower face, the high spot 97 on the cam ring 87 passes beyond the wheel 93, the plunger 91 is then thrust upwardly by means of the return spring 92 and the plate 72 is moved into the same plane as the plate 71 by means of the springs 85 and so that the plate 72 and the bar 112 are in required position to permit another turn of the wire 69 to be wound on the card 29. It will be seen, therefore, that the plate 72 and the bar 112 cooperate to guide each turn of wire to its required place on the card 29 and the plate 72 and bar 112 briefly hold the turn of wire in place against slipping along the card 29 when the edge of the card is of descending form.

In Figs. 17 through 21A the relative positions of the critically operating parts provided in the winding head 26 for insuring that each turn of wire will be guided to its required place and supported in its required place during the critical period of winding each turn are shown in steps occurring in a winding cycle. In Figs. 17, 17A and 17B it will be seen that when the pulley 179 has traveled about 260 degrees in a counter-clockwise direction from a point perpendicular to the upper surface of the card 29 which on a clockface would be the 12 o'clock position, one turn of the wire 69 is coming from the pulley 179 and is about to be laid across the lower surface of the card 29. The plate 72 at this time as shown in Fig. 17A is out of the plane of the plate 71 and in cooperation with the bar 112 is holding the last completed turn of wire on the card 29 in place. The finger 168 at this time, as shown in Fig. 17B, is in position to allow the next turn of wire to be laid across the forward edge 229 of the card 29. When the pulley 179 reaches the 3 o'clock position as shown in Fig. 18, the oncoming turn of wire 69 is laid completely across the lower surface of the card 29. At this time and as shown in Fig. 18A the plate 72 is in the same plane as the plate 71 and the bar 112 is in registry with the plates 71 and 72. The finger 168 as shown in Fig. 18B is still in the same position as in Fig. 17B. When the pulley 179, as shown in Fig. 19, is almost to the 12 o'clock position and the wire coming from the pulley 179 is perpendicular relative to the card 29 and so that the turn of wire 69 extends across the forward edge 229 of the card 29, the bar 112 as shown in Fig. 19A is supporting the turn of wire on the forward edge of the card 29 and so that the wire 69 will not slip along the contoured forward edge of the card 29. The plate 72 has started to move out of the plane of the plate 71 to guide and hold the wire 69 against slipping along the card 29 while the wire is being laid across the upper surface of the card 29. In Fig. 20 the pulley 179 has traveled counter-clockwise and reached about the 4 o'clock position and the last full turn of wire is still being supported in place by the plate 72 and the bar 112. By this time the tension on the wire 69 has caused the last completed turn to slightly sink into the sharp edges of the card 29 and so that the wire will not slip along the card 29 when the plate 72 and bar 112 are moved away from the turn of wire. In Figs. 21 and 21A the cycle has been completed and the parts are in the same positions as in Figs. 17 and 17A but one more turn of wire has been made on the card 29.

The wire positioning device 118 operates to guide each turn of wire 69 to the forward edge 229 of the card 29 and will hold each turn of wire in required position on the forward edge of the card when the edge line on the forward edge 229 of the card is of ascending character during the critical period of winding the turn of wire 69 across the forward edge 229 of the card 29 and until the turn of wire is somewhat impressed in the edge of the card 29. The electromagnet 120 is employed to cause the finger 168 to be withdrawn from its normal position relative to the card 29 once for each turn of wire. The electromagnet 120 may be energized from any suitable source of current supply under control of a switch, not shown, but which may be located, for instance, in the head stock 24 and controlled by operation of the lead screw 39 or shaft 54 so that the electromagnet will be energized at the required time.

Figure 22:
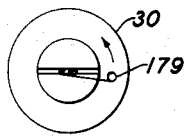
Figure 23:
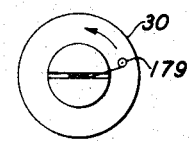
Figure 24:
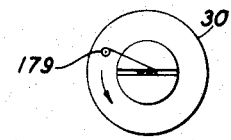
Figure 22A:
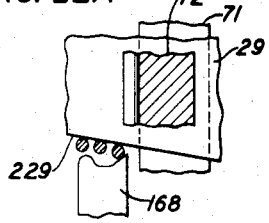
Figure 23A:
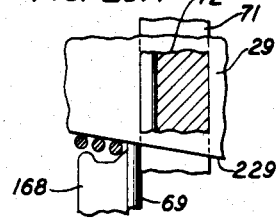
Figure 24A:
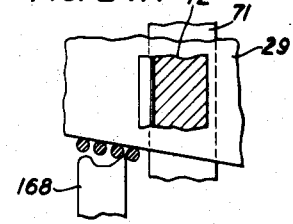
Figure 25:
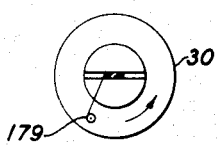
Figure 26:
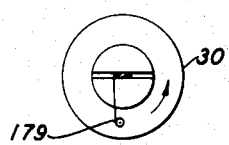
Figure 27:
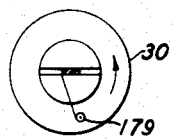
Figure 25A:
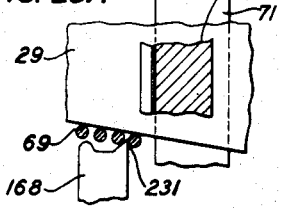
Figure 26A:
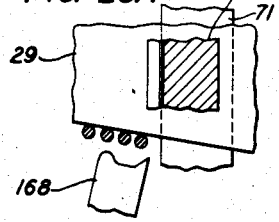
Figure 27A:
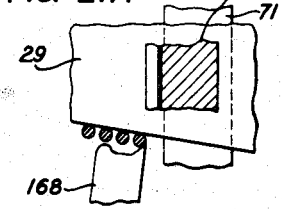
Figure 28:
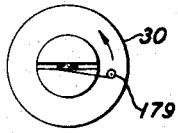
Figure 29:
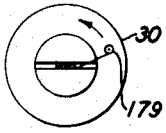
Figure 28A:
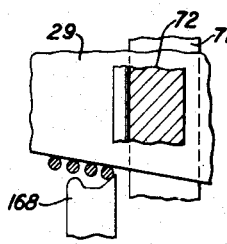
Figure 29A:
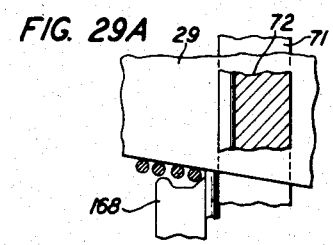

In Figs. 22 through 29A the relative critical positions of the parts employed in the wire positioning unit 121 to insure guiding and supporting each turn of wire during the critical period of winding the turn of wire across the forward edge 229 of the card 29 for up slope winding are shown in steps. When the pulley 179 is nearing the 3 o'clock position, as shown in Fig. 22, the finger 168 is in the position shown in Fig. 22A and ready to guide a new turn of wire to its required place. In Fig. 23 the pulley 179 has passed slightly beyond the 3 o'clock position and the new turn of wire is starting to be laid across the forward edge 229 of the card 29. It will be seen, as shown in Fig. 23A that as the new turn of wire is passing across the forward edge 229 of the card 29 the finger 168 and plate 72 are cooperating to guide the turn of wire to its required place. In Fig. 24 the pulley 179 has been carried counter-clockwise to about the 10 o'clock position and the turn of wire has been laid across the forward edge of the card 29. The finger 168 as shown in Fig. 24A is still holding the turn of wire just made from slipping back along the downward slope on the forward edge of the card 29 and the plate 72 has been moved out of the plane of the plate 71 and so that as the wire passes across the upper surface of the card 29 the wire will be guided to its required place on the upper surface of the card 29. In Fig. 25 the pulley 179 has reached about the 7 o'clock position and the turn of wire has been laid across the upper surface of the card 29 under guidance of the plate 72 and the spring guide 236. At this time the finger 168 as shown in Fig. 25A is still holding the last turn made across the forward edge of the card and the plate 72 is in such position that it is still resting against the wire on the upper surface of the card 29. The plate 71 however has been carried along to such position that it will not interfere with laying the wire across the lower surface of the card 29. In Fig. 26 the pulley 179 is in the 6 o'clock position and ready to lay the wire across the lower surface of the card 29. At this time, as shown in Fig. 26A, the finger 168 has been withdrawn from engagement with the wire 69, the electromagnet 120 having been energized to cause withdrawal of the finger 168 to the position shown. The finger 168 has been moved to the right of the last turn of wire by the thrust of the spring 173 in which pressure has been built up while the finger 168 was in the position shown in Fig. 25A and the winding head 26 and the wire positioning device 118 were being moved along the bed of the machine and relative to the card. In Fig. 27 the pulley 179 has passed counter-clockwise beyond the 6 o'clock position, the electromagnet 120 has been deenergized and the finger 168 as shown in Fig. 27A is coming back to normal position but to the right of the last turn of wire. In Fig. 28 the pulley 179 is almost in the 3 o'clock position and as shown in Fig. 28A the finger 168 is in normal position and where it will bear against the embossing 223 on the plate 72 until the plate 72 is withdrawn a very short distance later. At this point the cycle of laying one turn of wire 69 has been completed and another turn is about to be started across the forward edge of the card 29. In Fig. 29 the pulley 179 has passed counter-clockwise beyond the 3 o'clock position and proceeding to lay the wire across the forward edge of the card 29. At this time the finger 168 is in position for guiding and holding the new turn of wire in place and the plates 71 and 72 are in the same plane.

When the electromagnet 120 of the wire positioning device 118 is energized the yoke 131 is rocked downwardly from the position shown in Fig. 11 and so that the rail 141 pulls the arm 142 to rotate the turn block 157 against the action of the return spring 165. It will be seen, as shown in Fig. 16, that when the rail 141 is operated to pull the arm 142, the turn block 157 is rotated in a right-hand direction. In this movement the finger 168 is moved from the position shown in Fig. 25A to the position shown in Fig. 26A. In Fig. 25A the sharp end 231 of the finger 168 projects between two turns of the wire 69 wound on the card 29 and this is the position of the finger 168 when the electromagnet 120 is deenergized and a turn of the wire 69 is taking its required position on the forward edge 229 of the card 29. In this case the finger 168 is holding the last turn of wire from slipping towards the left on the card 29. The wire positioning device 118 will operate as required if the switch momentarily closes the circuit to the electromagnet 120 when the lead-off pulley 179 is at approximately 270 degrees counter-clockwise from the point at which the wire first touches the curved edge 229 of the card 29, or in other words, when the lead-off pulley 179 is in the 6 o'clock position. The switch must open immediately after closing so that the electromagnet 120 has time to be fully released and the parts of the wire positioning unit 121 have time to return to equilibrium and in place to support and guide the next turn of wire while it is being laid across the sloped edge 229 of the card 29.

When the width of the card 29 is increasing, the wire positioning unit 121 is in effect cammed by means of the card and wire along the track 148 against the action of the stem 155, the pressure of which is barely sufficient to thrust the wire positioning unit 121 along the track 148 when there is no resistance to such motion. When the electromagnet 120 is energized to cause the finger 168 to be withdrawn from the turn of wire on the card 29 the wire positioning unit does not move towards the card 29 since the side thrust of the body 144 on the track 148 is sufficient to stay the body 144 in its place even against the thrust of the stem 155. While the finger 168 is in engagement with the last turn of wire 69 and the winding head 26 is moving along the bed of the machine the plate 169 is pressed towards the turn block 157 against the action of the spring 173. When the finger 168 is disengaged from the last turn of wire 69 the plate 169 is moved away from the turn block 157 until the nut 172 engages the turn block 157. When the electromagnet 120 releases, the stem 155 and the spring 165 will return to equilibrium but the spring 165 having had developed therein a greater force than the stem will turn the turn block 157 until the arm 142 strikes the body 144. During the latter part of this movement the finger 168 is pushing against the last turn of wire 69 and this thrust is strong enough to push the body 144 back along the track 148 against the pressure of the stem 155. The finger 168 is now in position to guide and support the next turn of wire 69 as the wire 69 comes over the forward edge 229 of the card 29.

What is claimed is:

1. A machine for winding strand material on a support comprising means for maintaining said support in required position for winding the strand material thereon, a winding head operable to wind the strand material onto said support and means carried within said winding head and extending relatively close to a predetermined portion of said support and operating to guide the strand material to required positions on the predetermined portion of said support and operable to also briefly hold each turn of wire against slipping from its required position on said support during the critical period of applying the wire to the predetermined portion of said support.

2. A machine for winding strand material on a support comprising means for maintaining said support in required position for winding the strand material thereon, a winding head operable to wind the strand material onto said support, a bar slidably supported in said winding head and operable to guide the strand material to a required position on said support and means in said winding head to slidably support said bar.

3. A machine for winding wire in a plurality of spaced turns on a card, comprising a support, means on said support for maintaining said card in position for the wire to be wound thereon, a winding head supported on said support, means to cause relative movement of said winding head and said card, a rotatable member in said winding head encircling the position of said card and operable to turn about said card to wind the wire onto said card, means to operate said rotatable member and wire positioning means carried in said winding head and extending adjacent an edge of said card and operable to hold each turn of wire against slipping along said card during the critical period of winding the turns of wire across the edge of said card.

4. A machine for winding wire in a plurality of spaced turns on a card, comprising a support, means on said support for maintaining said card in position for the wire to be wound thereon, a winding head supported on said support, means to cause relative movement of said winding head and said card, a rotatable member in said winding head encircling the position of said card and operable to turn about said card to wind the wire onto said card, means to rotate said rotatable member, and a plurality of wire positioning means carried in said winding head and extending adjacent edge portions of said card and operable to hold each turn of wire against slipping along said card during the critical period of winding the turns of wire onto said card.

5. A machine for winding strand material on a flat support comprising means for maintaining said support in required position for the strand material to be wound thereon, a winding head operable to wind the strand material onto said support, plate means supported in said winding head and cooperatively forming an opening extening diametrically of said winding head, track means carried by said plate means, a bar movably supported in said track means and operable to guide the strand material to a required position on an edge of said support and means to move said bar relative to an edge of said support.

6. A machine for winding strand material on a flat support comprising means for maintaining said support in required position for winding the strand material thereon, a winding head, an apertured rotatable member in said winding head arranged around said support and operable to rotate around said support, means to rotate said member, means to cause relative movement of said winding head and said support, a supply of strand material operable to be wound on said support and carried by said winding head, strand guiding means movably supported in said winding head and located in the aperture in said member and operable to guide said strand material across an edge of said support during the winding operation and means to move said strand guiding means into positions to guide said strand material across an edge of said support.

7. A machine for winding strand material on a flat support comprising means for supporting said support in required position for winding the strand material thereon, a winding head operable to wind the strand material onto said support, a movably supported guiding member carried by said winding head and movable toward an edge of said support, said guiding member being operable to guide the strand material to a required position on an edge of said support and means to operate said guiding member to the required guiding position.

8. A machine for winding strand material on a flat support comprising means for supporting said support in required position for winding the strand material thereon, a winding head operable to wind the strand material onto said support, a pivotally supported finger carried by said winding head and movable relatively to an edge of said support, said finger being operable to guide the strand material to a required point on an edge of said support, means to urge said finger toward the edge of said support, an electromagnet to control the operation of said finger and means to control the operation of said electromagnet.

9. A machine for winding strand material on a flat support comprising means for supporting said support in required position for winding the strand material thereon, a winding head operable to wind the strand material onto said support, a pivotally supported finger carried by said winding head and movable toward an edge of said support, said finger being operable to guide the strand material to a required point on an edge of said support, means to urge said finger toward the edge of said support, an electromagnet to control the operation of said finger and means to control the operation of said electromagnet.

10. A machine for winding strand material on a flat support comprising means for supporting said support in required position for the strand material to be wound thereon, a winding head operable to wind the strand material onto said support, a pivotally supported turn block carried by said winding head, a body supporting said turn block, a track for said body, means to urge said body along said track, a finger supported on said turn block and extending toward an edge of said support, said finger being operable to guide the strand material to a required position on said support when said turn block is turned in one direction, means urging said turn block to turn in one direction, a movable rail operable to turn said turn block in another direction, a hook member slidable along said rail and forming a mechanical connection between said rail and said turn block, an electromagnet to operate said rail and means to control the operation of said electromagnet.

11. A machine for winding wire in a plurality of spaced turns on a card having a front edge not in parallel with the rear edge, comprising a support, means on said support for maintaining said card in position for the wire to be wound thereon, a winding head supported on said support, means to cause relative movement of said winding head and said card, rotatable means in said winding head encircling the position of said card and operable to turn about said card to wind the wire onto said card, means to operate said winding head, a bar carried in said winding head and extending adjacent the front edge of said card, a finger device carried in said winding head and extending adjacent the front edge of said card and in spaced relation with said bar, said finger device and said bar being operable to hold each turn of wire against slipping along the front edge of said card during the critical period of winding the turn of wire across the front edge of said card and a resilient guide carried in said winding head and extending toward the rear edge of said card and operable to guide each turn of wire to a required position on the rear edge of said card during the critical period of winding the turn of wire across the rear edge of said card.

12. A machine for winding strand material on a flat support, comprising means for supporting said support in required position for winding the strand material thereon, a winding head operable along the position of said support, an apertured rotatable member in said winding head disposed around said support and operable to turn about the axis of said support to carry said strand material around said support, means to turn said member, means to cause relative movement of said winding head and said support, a pair of plates supported in the space defined by said member, said plates being slightly spaced from each other to cooperatively form an opening to accommodate said support, a bar movably supported on one of said plates and extending into the space between said plates, means to move said bar in one direction in the space between said plates and toward an edge of said support, a turn block supported near said plates, means to pivotally support said turn block, means to turn said turn block, a finger carried by said turn block and extending toward said plates and said bar and said finger being operable to guide said strand material to a required position on an edge of said support.

13. A machine for winding strand material on a flat support, comprising means for supporting said support in required position for winding the strand material thereon, a winding head operable to wind the strand material onto said support, an apertured rotatable member in said winding head extending around the axis of said support and operable to turn about the axis of said support, means to turn said member, means to cause relative movement of said winding head and said support, two plates in said winding head and supported in the aperture in said member, one of said plates being fixedly supported and the other movable, said plates being arranged to form an opening extending diametrically of the aperture in said member and for accommodation of said support, said plates being normally in the same plane, a plunger supported in said winding head and operable to move the movable one of said plates from its normal plane, a cam supported on said member and operable to move said plunger to cause movement of the movable plate in one direction, and means to return the movable plate to the same plane as the fixedly supported plate.

14. A machine for winding strand material on a support, comprising means for supporting said support in required position for winding the strand material thereon, a winding head, an apertured rotatable member in said winding head extending around the position of said support and operable to turn about the axis of said support, means to turn said member, means to cause relative movement of said winding head and said support, an annular rotatable holder movably supported on said member and arranged to carry a supply of said strand material, a pivotally supported arm carried by said member and arranged to move relative to the axis of said support, a system of pulleys carried partly by said member and partly by said arm and arranged to guide said strand material from said supply to said support, said arm being operable to move relative to the pulleys carried by said member to help to maintain said strand material taut in passing from said supply to said support, a brake device operable in accordance with movements of said arm, said brake device comprising a brake drum formed on said holder, a pivotally supported brake shoe carried by said member, a pivoted lever mechanically connected to said brake shoe, a cam rotatably supported on said member and engaging said lever and adjustable means mechanically connecting said cam to said arm and said brake device being operable to control the rotation of said holder and cooperating with said arm in maintaining said strand material taut in its passage from said supply to said support.

15. A machine for winding strand material on a support, comprising means for supporting said support in required position for winding the strand material thereon, a winding head, an apertured rotatable member in said winding head extending around the position of said support and operable to turn about the axis of said support, means to turn said member, means to cause relative movement of said winding head and said support, an annular holder rotatably supported on said member and arranged to carry a supply of said strand material, said holder being operable to rotate independently of said member, a pivotally supported arm carried by said member, a system of pulleys to guide said strand material from said supply to said support, some of the pulleys in said system being carried by said member, one at least of the pulleys in said system being carried on a free end portion of said arm, a brake drum formed on said holder, a pivotally supported brake shoe carried by said member and engageable with said brake drum, a pivotally supported lever mechanically connected to said brake shoe and carried by said member and a cam mechanically connected to said arm and controlling the operation of said lever and said brake shoe in accordance with pivotal movements of said arm.

16. A machine for winding wire in a plurality of spaced turns on a card having at least a front edge portion of such form that it extends out of parallel relation with the longitudinal axis of the card, comprising a support, means on said support for maintaining said card in position for the wire to be wound on said card, a winding head supported on said support, means to cause relative movement of said winding head and said card, a rotatable member in said winding head encircling the position of said card and operable to turn about said card to carry wire around said card, means to turn said member about said card, a supply of wire carried by said winding head, a rotatable holder concentric with said member and providing a support for said supply of wire, said rotatable holder being operable to rotate with said member and independently of said member, a spring-loaded pivotally supported flyer arm carried on said member, a system of pulleys carried partly on said member and partly on said flyer arm and operable to carry wire from said supply to said card, a brake device carried on said member and operable to engage said rotatable holder, a brake operating means operating to transmit pivotal movements of said flyer arm to said brake device, said brake device being operable to control rotations of said rotatable holder, said flyer arm, said holder and said brake device cooperating to maintain said wire at a required tension during the passage of said wire from said supply onto said card, a bar carried in said winding head and extending adjacent said front edge of said card and operable to hold each turn of wire from slipping along said front edge of said card during the critical period of winding the wire across the front edge of said card, when the point of winding on said card presents a downward slope, a movable finger device carried in said winding head and extending adjacent said front edge of said card and operable to hold each turn of wire from slipping along said front edge of said card during the critical period of winding the wire across the front edge of said card, when the instant point of winding on said card presents an upward slope, and a resilient guide carried in said winding head and extending adjacent a rear edge of said card and operable to guide each turn of wire to a required position on the rear edge of said card during the critical period of winding the wire across the rear edge of said card.

ROBERT G. McCOY.